(12) United States Patent  
Ito

(10) Patent No.: US 8,879,087 B2
(45) Date of Patent: Nov. 4, 2014

(54) INFORMATION PROCESSING APPARATUS THAT PERFORMS DISPLAY PROCESSING ACCORDING TO A JOB STATE AND METHOD OF CONTROLLING THE SAME

(75) Inventor: Daisuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 13/564,830

(22) Filed: Aug. 2, 2012

(65) Prior Publication Data

US 2013/0044346 A1 Feb. 21, 2013

(30) Foreign Application Priority Data

Aug. 16, 2011 (JP) ................................ 2011-178109

(51) Int. Cl.
```
G06K 15/00    (2006.01)
H04N 1/00     (2006.01)
H04N 1/32     (2006.01)
G06K 15/02    (2006.01)
G06F 3/12     (2006.01)
```
(52) U.S. Cl.
CPC ............ *G06K 15/02* (2013.01); *H04N 1/00411* (2013.01); *H04N 1/32662* (2013.01); *H04N 1/00474* (2013.01); *H04N 1/00503* (2013.01); *H04N 2201/0039* (2013.01); *H04N 1/32635* (2013.01); *H04N 1/32657* (2013.01); *H04N 2201/0094* (2013.01); *H04N 1/00424* (2013.01); *H04N 1/00244* (2013.01); *H04N 1/32694* (2013.01); *H04N 1/00482* (2013.01); *H04N 1/00973* (2013.01); *H04N 1/00464* (2013.01)
USPC .......................................... 358/1.14; 358/1.1

(58) Field of Classification Search
USPC ........ 358/1, 13, 1.14, 15, 1.18; 382/131, 173; 715/212; 345/173
See application file for complete search history.

(56) References Cited

U.S. PATENT DOCUMENTS

| 2002/0171681 A1* | 11/2002 | Nomura et al. ................ 345/772 |
| 2007/0165265 A1* | 7/2007 | Ito et al. ........................ 358/1.15 |
| 2008/0307319 A1* | 12/2008 | Iwata et al. .................... 715/748 |
| 2011/0199645 A1* | 8/2011 | Ito ................................. 358/1.15 |
| 2012/0089481 A1* | 4/2012 | Iozzia et al. ............... 705/26.41 |

FOREIGN PATENT DOCUMENTS

JP   08-147135 A   6/1996

* cited by examiner

*Primary Examiner* — Gabriel Garcia
(74) *Attorney, Agent, or Firm* — Carter, DeLuca, Farrell & Schmidt, LLP

(57) ABSTRACT

An information processing apparatus that executes a job in accordance with an instruction from a web application of a web server and a method of controlling the information processing apparatus are provided. Error screen information and the web application and/or the job that is received from the web application are associated and stored in a memory. Information in the memory is updated for association of error screen information that indicates an error during job execution with another application other than the web application, and the error screen information that indicates the error is displayed in front of a screen for the other associated application based on the information.

8 Claims, 6 Drawing Sheets

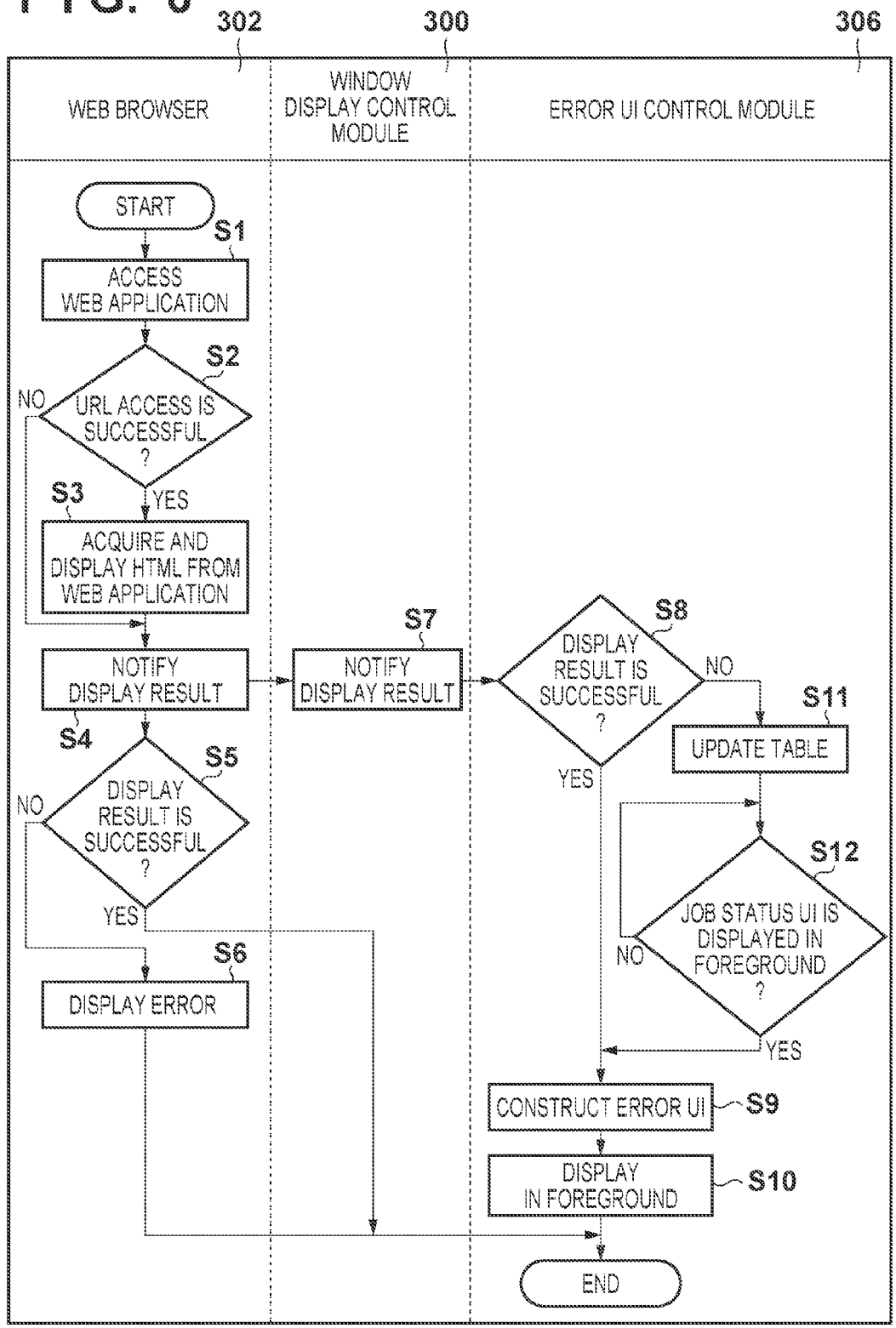

INFORMATION PROCESSING APPARATUS THAT PERFORMS DISPLAY PROCESSING ACCORDING TO A JOB STATE AND METHOD OF CONTROLLING THE SAME

BACKGROUND OF THE INVENTION

1. Field of the Invention

The present invention relates to an information processing apparatus that receives a job from a web application of a web server and executes the job, and to a method for controlling the information processing apparatus.

2. Description of the Related Art

Conventionally, there is a print system that includes an image forming apparatus such as a multi-function peripheral (MFP) and an information processing terminal such as a personal computer (PC) or the like serving as a web server in which a web application is provided. In print system, a user accesses a web application via a web browser on an image forming apparatus, and the web application inputs a print job to the image forming apparatus in accordance with an instruction from the user.

One example of a method for displaying an error in the print system is a method in which in the case where an error occurs while the image forming apparatus is executing a print job, a screen that indicates error content is displayed in the foreground of an operation screen of the image forming apparatus at the timing when the web application that has input the print job is displayed. This method is advantageous in terms of being easily understandable in that the user's attention is prompted since the screen indicating the error content continues to be displayed in the foreground of the operation screen of the image forming apparatus if the image forming apparatus tries to display the web application that has input the print job while the error occurs.

Although prompting user's attention is considered in the above-described display method, there is a problem in that since the screen indicating the error content is displayed in the foreground of the operation screen at the timing when the web application is displayed, in the case of web application display failure, the timing will be lost and the screen indicating the error content cannot be displayed in the foreground of the screen.

To address this problem, for example, Japanese Patent Laid-Open No. 8-147135 discloses a technique in which parent-child relationships are established for screens, and the result of processing for rendering a child screen is reflected in multiple parent screens. However, with this technique, although it is possible to associate screens with each other, it is not sufficient in terms of performing display processing according to a job state since job information is not associated with the screens.

SUMMARY OF THE INVENTION

An aspect of the present invention is to eliminate the above-mentioned problems in the conventional technology.

A feature of this invention is to provide a technique that can perform display processing according to a job state even in the case where web application display has failed.

According to an aspect of the present invention, there is provided an information processing apparatus that executes a job in accordance with an instruction from a web application of a web server, the information processing apparatus comprising: a storage unit configured to associate and store error screen information and the web application and/or a job that has been received from the web application; an update unit configured to update information in the storage unit for association of error screen information that indicates an error during job execution with another application other than the web application; and a display control unit configured to display, in a case where a communication error has occurred with the web application, error screen information that indicates the error in front of a screen for the other associated application based on the information stored in the storage unit.

According to another aspect of the present invention, there is provided an image processing apparatus control method for controlling an information processing apparatus that executes a job in accordance with an instruction from a web application of a web server, the control method comprising: a storage step of associating and storing in a memory error information and the web application and/or a job that has been received from the web application; an update step of updating information in the memory for association of error screen information that indicates an error during job execution with another application other than the web application; and a display control step of displaying, in a case where a communication error has occurred with the web application, error screen information that indicates the error in front of a screen for the other associated application based on the information stored in the memory.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flowchart for describing processing for updating the table in the MFP according to the embodiment.

DESCRIPTION OF THE EMBODIMENTS

Embodiments of the present invention are described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. It should be noted that in the following embodiment, an MFP is described as an example of an information processing apparatus of the present invention, but quite naturally, the present invention is not limited to the MFP.

Figure 1:
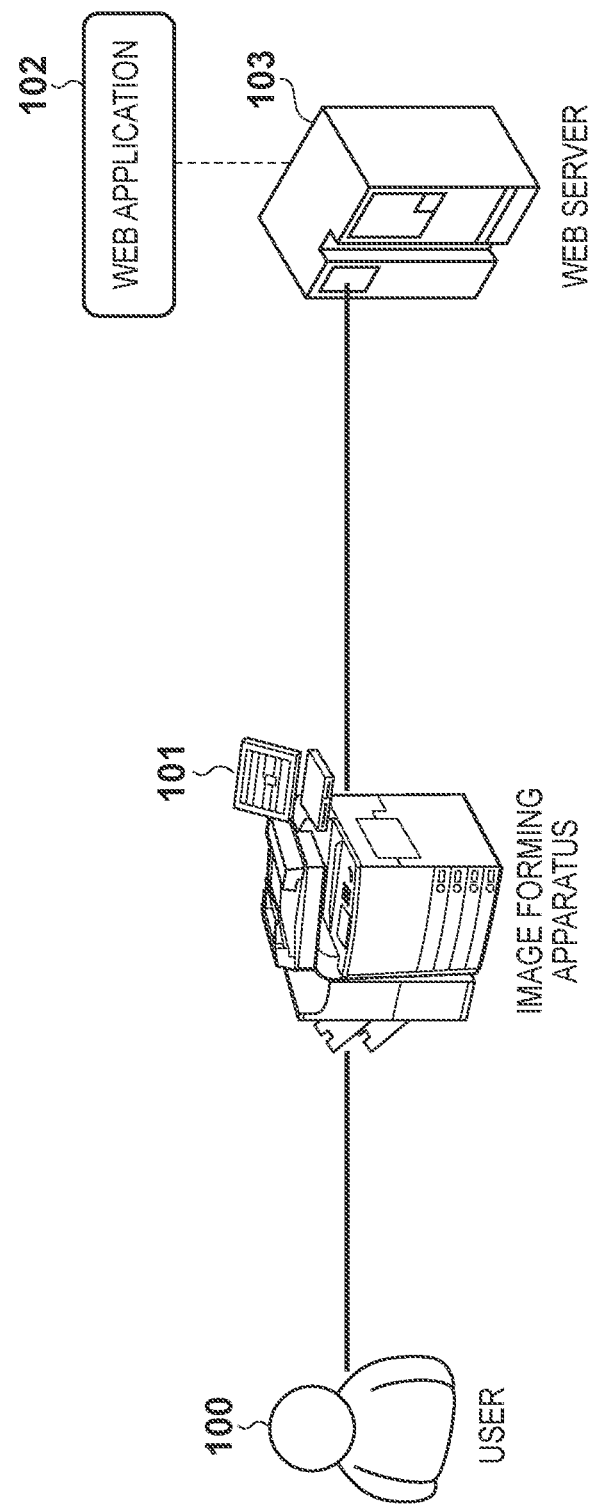
FIG. 1 is a diagram showing an example of a configuration of a print system according to an embodiment.

FIG. 1 is a diagram showing an example of the configuration of a print system according to an embodiment.

The print system according to the present embodiment includes an image forming apparatus (MFP) 101, a web application 102, and a web server 103, and the MFP 101 is connected with the web server 103 via a network.

A user 100 operates the MFP 101 to use the web application 102 on the web server 103. The web application 102 can give a job (scan or print) execution instruction to the MFP 101. It should be noted that a network connection between apparatuses of the print system may be either wired or wireless. Moreover, the MFP 101 needs to be capable of web application display and job execution, and may be, for example, a printer such as a laser beam printer or an ink jet printer, or may be another device such as a scanner or a facsimile device. Furthermore, the web server 103 needs to have a function for executing the web application, and the web server 103 is not limited to a PC (personal computer).

Figure 2:
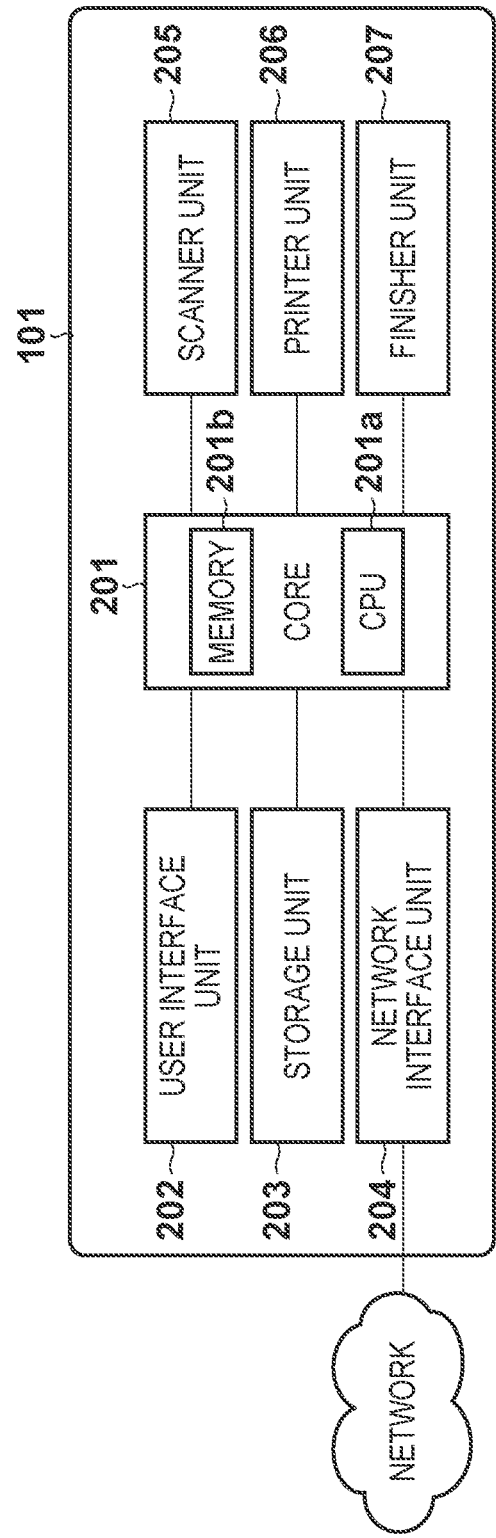
FIG. 2 is a block diagram illustrating a hardware configuration of an MFP according to the embodiment.

FIG. 2 is a block diagram illustrating a hardware configuration of the MFP 101 according to the present embodiment.

A user interface unit 202, a storage unit 203, a network interface unit 204, a scanner unit 205, a printer unit 206, and a finisher unit 207 are connected to a core 201 that includes a CPU 201a, a memory 201b, and a bus. The user interface unit 202 can display information for the user 100, and can receive an operation from the user 100. The storage unit 203 can store and save software groups and data groups in the apparatus. The network interface unit 204 provides a communication function that connects the MFP 101 and a network. The scanner unit 205, the printer unit 206, and the finisher unit 207 can execute jobs such as a copy job, a print job, and a scan job, and also post-processing such as staple processing, by being respectively controlled in coordination by software groups in the MFP 101.

It should be noted that the constituent elements in FIG. 2 are examples of hardware elements, and the present invention is not limited to the described content.

Figure 3:
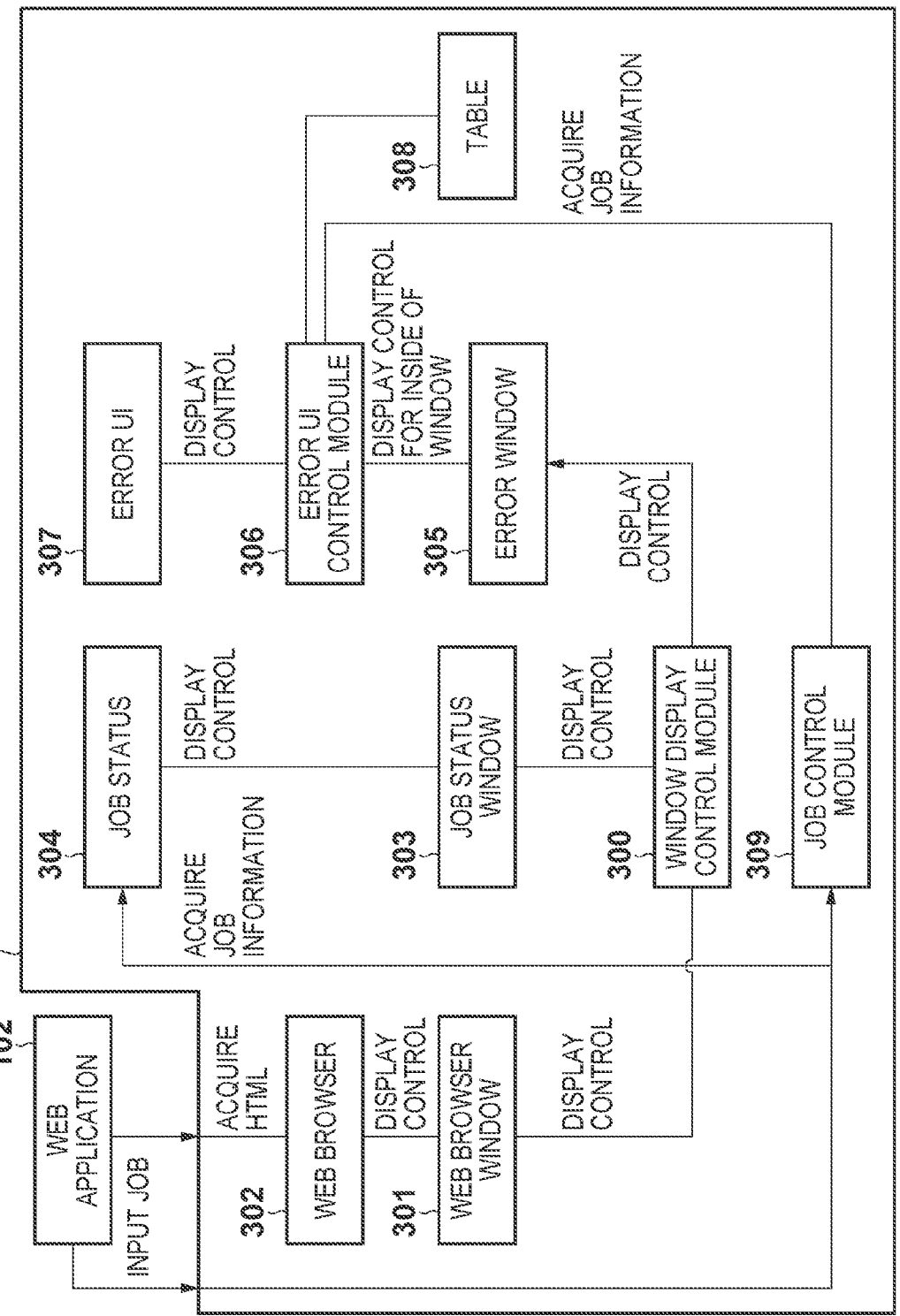
FIG. 3 is a diagram illustrating software that is saved in a storage unit of the MFP according to the embodiment.

FIG. 3 is a diagram illustrating software that is saved in the storage unit 203 of the MFP 101 according to the present embodiment. The CPU 201a of the MFP 101 according to the present embodiment executes functions of software shown in FIG. 3.

A window display control module 300 performs control of windows that are displayed on the user interface 202 of the MFP 101. Examples of the windows that are controlled by the window display control module 300 are a web browser window 301, a job status window 303, an error window 305 and the like. Display control is performed by switching and displaying those windows as necessary. Also, the windows can each know the window state of the other windows and perform control for displaying each other via the window display control module 300.

The web browser window 301 performs control for displaying the web browser 302. Also, the web browser 302 can communicate with the web application 102 via a network, and can acquire HTML data and perform rendering of the HTML data and display control.

The web application 102 of the web server 103 can input a job to a job control module 309 through a network, and cause the MFP 101 to execute the job. The job status window 303 performs control for displaying a job status 304. The job status 304 acquires job information from the job control module 309, and displays a list of the statuses of all of the jobs that exist in the MFP 101. The error window 305 performs display control for the inside of the window of an error UI control module 306. The error UI control module 306 can acquire job information in the MFP 101 by working in cooperation with the job control module 309. Moreover, the error UI control module 306 can perform data control such as updating information in a table 308 using the acquired job information. Furthermore, the error UI control module 306 generates an appropriate error UI 307 based on information of the table 308, and performs control for displaying the error window 305 by specifying an application that is to be displayed. It should be noted that the table 308 is stored in the storage unit 203 in FIG. 2.

It should be noted that examples of jobs according to the present embodiment include a print job, a scan job, a post-processing job (finishing job), and a storage job.

Figure 4:
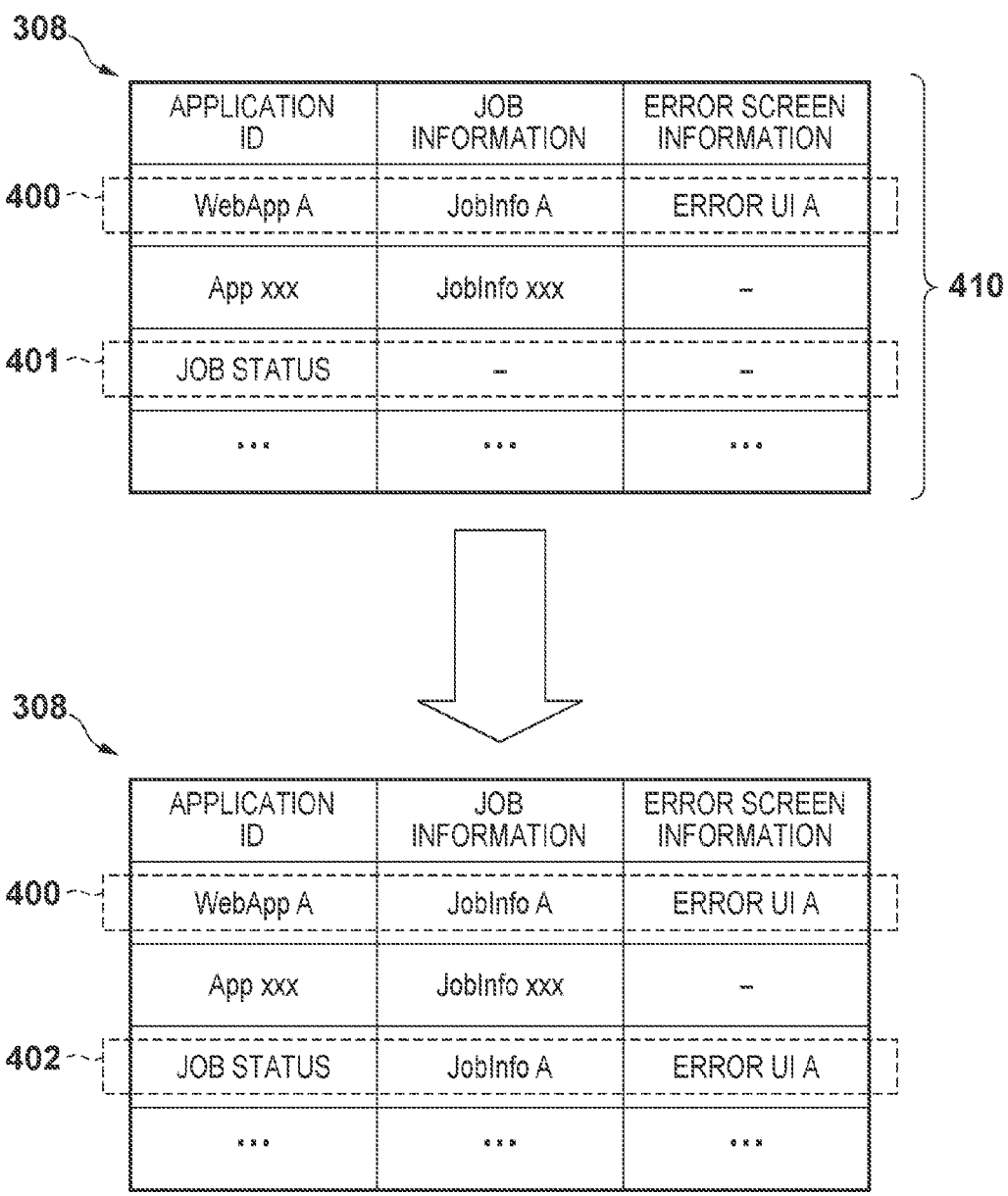
FIG. 4 is a diagram showing an example of information that is managed in a table according to the embodiment.

FIG. 4 is a diagram showing an example of information that is managed by the table 308 according to the present embodiment.

Constituent elements of the table 308 include an application ID that specifies an application that is to be displayed, job information, and error screen information. The error UI control module 306 can add, delete, and edit information for those constituent elements. A constituent element group 400 regarding the web application 102 is shown as an example of the constituent elements. In this example, a web application A whose application ID is a "webApp A", a "JobInfo A" (job A) serving as job information that has been input, and error screen information "errorUI A" in the case of error occurrence in the job are set and associated.

Similarly, a constituent element group 401 regarding a job status application is set to display the job status 304 when the job status application is executed.

The error UI control module 306 can link applications, job information, and an error UI that is to be displayed, based on the constituent element groups of the table 308. Job information and an error UI that are related to the web application 102 can be linked to the job status application by applying the table 308.

Figure 5A:
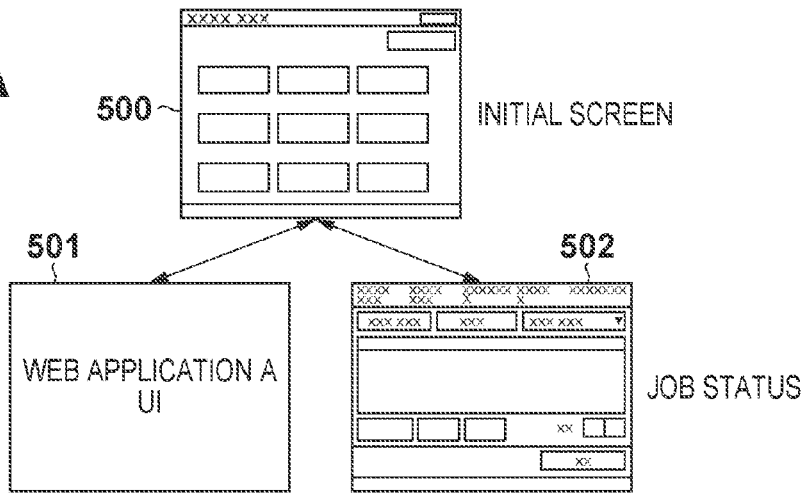
FIGS. 5A to 5C are diagrams illustrating examples of screens that are displayed by the MFP according to the embodiment.
Figure 5B:
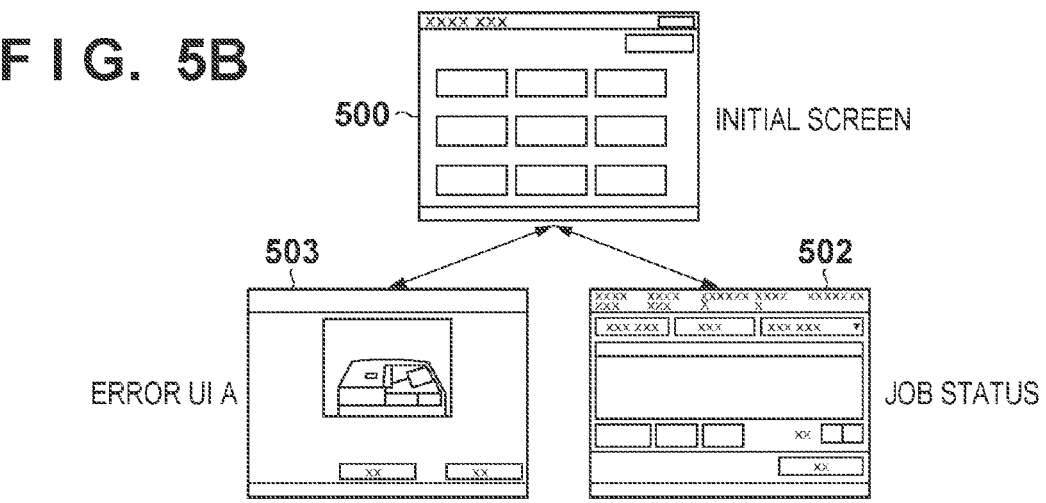
Figure 5C:
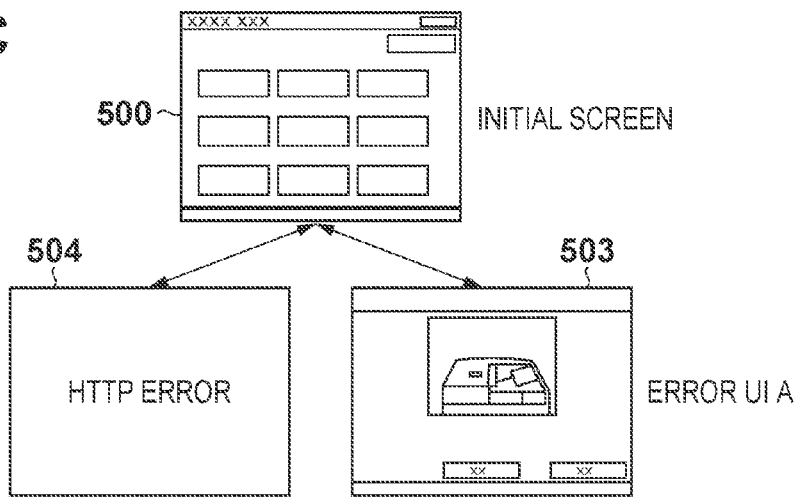

FIGS. 5A to 5C are diagrams illustrating examples of screens that are displayed by the MFP 101 according to the present embodiment.

FIGS. 5A to 5C show an initial screen 500 that is displayed first in an initial state of the user interface unit 202, and buttons that are related to applications are disposed on the screen. When a button is pressed, as shown in FIG. 5A, the initial screen 500 can transition to an application screen 501 or 502 that corresponds to the button, such as a screen displaying the web application 102 or the job status application.

As an example, there is a case where the web application 102 inputs a job to the MFP 101 and some kind of error occurs in the MFP 101 while the job is being executed, and thus the job execution is temporarily stopped. In this case, as shown in FIG. 5B, the initial screen 500 transitions to the screen 501 for the web application 102, and a screen that shows error content such as an error UI A 503 is displayed over the screen 501 (step S8 in FIG. 6). In other words, the error UI A 503 is displayed in the foreground of the screen. Notifying the user that an error occurred is a standard operation. The content of the table 308 in this case corresponds to the case indicated by 410 in FIG. 4. In other words, in 410 of FIG. 4, "errorUI A" is set to be displayed if an error occurs while display is being executed by the web application 102, and the job status is set to be displayed if the job status application is executed.

In contrast, in an example of FIG. 5C, there is a case where the web application 102 fails in the display due to some sort of cause such as an HTTP transmission error (NO in step S8 of FIG. 6). In this case, an area indicated by 401 is changed to the area indicated by 402 in the table 308 in FIG. 4. Specifically, here, job information "JobInfo A" and error screen information "errorUI A" are associated with a job status application whose application ID is "job status". Accordingly, even in the case where the web application 102 has failed in the display, as shown in FIG. 5C, an error UI A 503 is displayed in the foreground of the screen 502 on which the job status had been displayed in FIGS. 5A and 5B by the execution of the job status application.

In the present embodiment, at this time, the error UI control module 306 performs processing for updating the table 308 shown in FIG. 4 (step S11 of FIG. 6), and links the error UI A serving as the error screen information to the job status application (step S12).

In FIG. 5C, due to the processing described above, when the initial screen 500 transitions to the screen 501 for the web application 102, an error screen 504 that indicates that the display failed due to some sort of cause is displayed. Moreover, at the time of transition to the job status application, it is possible to display the error UI A 503. This is described below in detail with reference to the flowchart in FIG. 6.

FIG. 6 is a flowchart for describing processing for updating the table 308 in the MFP according to the present embodiment. It should be noted that this processing is realized by the CPU 201a provided in the core 201 deploying a program of the storage unit 203 to the memory 201b and executing the program. The processing is started by the user 100 of the MFP 101 operating the user interface unit 202, and pressing a button for the web browser 302 on the initial screen 500 in FIGS. 5A to 5C.

Firstly, in step S1, the web browser 302 accesses the web application 102 of the Web server 103. Next, the procedure proceeds to step S2, and the web browser 302 determines whether or not the access to the web application 102 via a URL was successful, and in the case where the access was successful, the procedure proceeds to step S3, and in the case where the access was not successful, the procedure proceeds to step S4. In step S3, the web browser 302 acquires HTML data from the web application 102, and displays an operation screen on the user interface unit 202 based on the HTML data. Then, the procedure proceeds to step S4, and the web browser 302 notifies the window display control module 300 of a result of the display processing performed using the HTML data acquired from the web application 102, and then the procedure proceeds to step S5.

In step S5, the web browser 302 makes a determination regarding the displayed result, and in the case of a determination that the access was successful, the processing of the web browser 302 ends. On the other hand, in the case of a determination that the access was unsuccessful, the procedure proceeds to step S6, and the web browser 302 performs error display as indicated by 504 in FIG. 5C, and then this processing ends. It should be noted that the error screen (504 in FIG. 5C) displayed in step S6 is an error screen that is generated by the web browser 302 in the case where a communication error has occurred between the web browser 302 and a web application 102. In other words, the error screen is an error screen that is not managed by the table in FIG. 4 (error screen that is not a target of management).

Also, in step S7, the window display control module 300 notifies the error UI control module 306 of the display processing result that the window display control module 300 has received from the web browser 302. Accordingly, the error UI control module 306 executes the processing of step S8 onward.

In step S8, the error UI control module 306 makes a determination regarding the display processing result that the error UI control module 306 has received from the window display control module 300, and in the case of a determination that the HTML data display processing was successful, the procedure proceeds to step S9, and in the case of a determination that the HTML data display processing was unsuccessful, the procedure proceeds to step S11. In step S9, the error UI control module 306 constructs an error UI 307 that is related to a job that was input by the web application 102 and in which an error is occurring, and then the procedure proceeds to step S10. In step S10, the error UI control module 306 displays the error UI 307 constructed in step S9 in the foreground of the user interface unit 202 in the MFP 101 (for example, error UI A 503 in FIG. 5B), and then the processing ends.

On the other hand, in step S11, the error UI control module 306 updates the table 308 such that the error UI 307, which is related to the job that was input by the web application 102 and also in which an error is occurring, is associated with a job status application other than the web application 102. In other words, here, the constituent element group 401 of the table shown in FIG. 4 is updated to a constituent element group indicated by 402, and the procedure proceeds to step S12. In step S12, the error UI control module 306 determines whether or not the job status application is displayed in the foreground, and in the case where the job status application is displayed in the foreground, the procedure proceeds to step S9. On the other hand, in the case where the job status application is not displayed in the foreground in step S12, the procedure repeats step S12.

In the present embodiment, a case is considered in which the web application 102 inputs a job to the MFP 101, an error occurs while the MFP 101 executes the job, and the error UI 307 that indicates the error occurrence is displayed. In this case, even if the web application 102 that is to display the error UI in the foreground has failed in the display, for example, as shown in FIG. 5C, it is possible to display the error UI A 503 on the screen 502 on which the job status application is displayed in FIG. 5B. Accordingly, convenience for the user is improved.

According to the present invention, in the case where the web application 102 that is displayed on the web browser 302 on the MFP 101 inputs a job to the MFP 101, and an error occurs during the job execution by the MFP 101, even if the web application 102 that is to display an error UI in the foreground has failed in the display when the error UI is to be displayed, convenience for the user is improved since it is possible to display the error UI (503) on a screen (502) that displays a job status application.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-178109, filed Aug. 16, 2011 which is hereby incorporated by reference herein in its entirety.

What is claimed is:

1. An information processing apparatus being capable of executing a job in accordance with an instruction from a web application of a web server, the information processing apparatus comprising:
- a display control unit configured to display a group of buttons corresponding to applications that include the web application, and to cause a transition to a corresponding screen according to a button operation for any of the buttons in the group of buttons;
- a storage unit configured to associate and store error screen information and the web application and/or a job that has been received from the web application; and
- an update unit configured to update information in the storage unit for association of error screen information that indicates an error during job execution with another application other than the web application,
- wherein the display control unit displays, in a case where a communication error has occurred with the web application, error screen information that indicates the error in front of a screen for the another application based on the information stored in the storage unit.

2. The information processing apparatus according to claim 1, wherein the update unit updates information in the storage unit in a case where a communication error has occurred with the web application.

3. The information processing apparatus according to claim 1, wherein the screen includes a screen that displays a job status.

4. The information processing apparatus according to claim 1, wherein the update unit updates error screen information associated with the another application to error screen information that has been stored in association with the web application.

5. The information processing apparatus according to claim 1, wherein the display control unit performs control such that error screen information that indicates the error is displayed according to the execution of the another application.

6. The information processing apparatus according to claim 1, wherein the another application is a job status application that displays a job status on a screen.

7. An image processing apparatus control method for controlling an information processing apparatus being capable of executing a job in accordance with an instruction from a web application of a web server, the control method comprising:
- displaying a group of buttons corresponding to applications that include the web application, and to causing a transition to a corresponding screen according to a button operation for any of the buttons in the group of buttons;
- associating and storing in a memory error information and the web application and/or a job that has been received from the web application; and
- updating information in the memory for association of error screen information that indicates an error during job execution with another application other than the web application,
- wherein, in a case where a communication error has occurred with the web application, error screen information is displayed that indicates the error in front of a screen for the another application based on the information stored in the memory.

8. A non-transitory computer-readable storage medium that has stored therein a program for causing a computer to execute an image processing apparatus control method for controlling an information processing apparatus being capable of executing a job in accordance with an instruction from a web application of a web server, the control method comprising:
- displaying a group of buttons corresponding to applications that include the web application, and to causing a transition to a corresponding screen according to a button operation for any of the buttons in the group of buttons;
- associating and storing in a memory error information and the web application and/or a job that has been received from the web application; and
- updating information in the memory for association of error screen information that indicates an error during job execution with another application other than the web application,
- wherein, in a case where a communication error has occurred with the web application, error screen information is displayed that indicates the error in front of a screen for the another application based on the information stored in the memory.

* * * * *